United States Patent [19]
McDonnell

[11] 3,841,354
[45] Oct. 15, 1974

[54] FLOW REGULATING DEVICE
[76] Inventor: Roy Edward McDonnell, 15 Miller St., Canberra, Australia 2601
[22] Filed: May 31, 1973
[21] Appl. No.: 365,454

[30] Foreign Application Priority Data
May 22, 1973 Australia.............................. 9074/73

[52] U.S. Cl.................................. 138/43, 251/126
[51] Int. Cl............................................. F16d 1/00
[58] Field of Search....................... 138/43; 251/126

[56] References Cited
UNITED STATES PATENTS
2,323,115   6/1943   Bryant.................................. 138/43
2,568,123   9/1951   Goldberg.............................. 138/43

Primary Examiner—Charles A. Ruehl

[57] ABSTRACT

A flow regulating device comprised of an internally threaded tubular member having an externally threaded pin screwed therein provides a helical capillary channel around the thread of the pin. The threads at the lower portions of the pin and tubular member are formed to allow variation of the cross-sectional area of the capillary channel on rotation of the pin in the tubular member.

9 Claims, 3 Drawing Figures

FLOW REGULATING DEVICE

This invention relates to a flow regulating device, and in particular to such a device which is capable of providing fine and accurate regulation of liquid flow.

In the field of medicine in particular, there is often a need to provide fine and accurate regulation of liquid flow, for example, in the case of intra-venous and other infusions of blood and other liquids, and it is of primary importance to the welfare of the patient that this regulation of the flow be reliable and that it does not vary over lengthy periods of time. The usual methods of controlling the flow of such infusions presently in use in hospitals, surgeries and the like utilize the principle of constriction of a flexible tube through which the liquid being infused is flowing. Such constriction, or relaxation of the constriction, of course diminishes or increases the flow of the liquid respectively and control of the flow over periods of time is obtained by constriction or relaxation as necessary. The usual apparatus by which such control is presently attained utilizes a form of screw operated clamp which grips the flexible tube between a pair of jaw members so that opening and closing of the jaw members by appropriate operation of the screw causes constriction or relaxation of constriction of the tube as desired or necessary.

In use in hospitals and the like, it is found that difficulties arise with the use of this screw-operated type of apparatus in firstly attaining a desired rate of flow and secondly in maintaining a desired rate of flow over periods of time. This is particularly apparent where very low rates of flow are to be utilized, for example of the order of approximately 20 drops, corresponding to roughly 1 mil., per minute, or even lower. The establishment of such low rates of flow with existing apparatus is found to take even skilled nurses a good deal of time and even after an initial desired rate has been established, constant checking every ten or fifteen minutes is necessary since changes which occur in the tube wall material under the influence of the constriction have the effect of varying any established rate of flow. Thus considerable time of skilled nursing staff is taken up by the routine checking of rates of flow of infusions.

It is a primary object of the present invention to provide a flow regulating device which will enable rapid and reliable establishment of preselected rates of flow and maintain such rates over long periods of time. Whilst the foregoing description emphasizes the need for such a device in the medical field, the present invention is applicable to all cases in which the rate of flow of a liquid must be precisely regulated. Thus, it is also applicable in the chemical industry for titration of solutions and for controlling certain processes by metered introduction of reactants or the like.

In U.S. Pat. No. 3,398,860 to P. Battig, there is disclosed a device of the type to which the present invention relates. This patent relates to a device for fine metering of liquids, which consists of a tubular body to which the liquid is supplied at one end and from which the liquid is withdrawn at the other end, and a pin fitting exactly in the tubular body and inserted in one end thereof so as to be axially displaceable, the device being characterized by the feature that a helical capillary channel is provided in the internal surface of the tubular body or in the external surface of the pin. The rate of flow in such a device is controlled by variation of the length of the capillary channel, the rate of flow being in linear proportion to the length of the channel, and the provision of the channel in helical form provides the dual advantage of enabling lengthening or shortening of the channel as desired by axial displacement of the pin in relation to the tubular body and thus varying the extent of penetration in the tubular body, and also of enabling relatively long capillary channels to be accommodated in an easily handled piece of apparatus. In the aforesaid United States patent, the pin may be provided with a threaded part and the tube with an internal thread corresponding to this threaded part, the capillary channel being formed by removing part of the ridge of the screwthread of the threaded part of the pin or of the internal thread of the tubular body. It is indicated that such a design of the device for fine metering of liquids makes possible and extremely simple exact adjustment of the rate of flow required within very wide limits, which can be carried out very rapidly even by unskilled staff.

According to the present invention, there is provided a device for regulating the flow of a liquid which comprises a tubular body portion provided with an internal helical thread, said liquid being supplied at or towards one end of said body portion and being withdrawn at or towards the other end of said body portion; and a pin fitting within the tubular body portion and inserted in one end thereof, and being provided with an external helical thread cooperating with the said internal helical thread of the body portion such that rotation of the pin with respect to said body portion causes axial displacement of the pin within the body portion;

said external helical thread on said pin having a first and a second end, the ridge of the external helical thread being removed to an increasing extent over at least part of the length thereof from said first to said second end such that said ridge is completely removed at said second end thereof, and said internal helical thread in said body portion having a first and a second end corresponding to said first and second ends of said external helical thread, the trough of the internal helical thread being filled to an increasing extent over at least part of the length thereof from said first to said second end such that said trough is completely filled at said second end thereof, the length of said internal helical thread over which the trough of the thread is filled to an increasing extent corresponding to the said length of said external helical thread over which the ridge of the thread is removed to an increasing extent such that the extent to which the trough of the internal helical thread is filled at any point on the length thereof corresponds with the extent to which the ridge of the external helical thread is removed at a corresponding point on the length thereof.

The device of the present invention may be made of any suitable material however, particularly for medical use, metals which can be sterilized, such as stainless steel, or plastics materials such as polymethyl methacrylates (Perspex) and polystyrenes are preferred. The plastics materials aside from being more easily sterilized, for example by gamma-radiation, also have a cost advantage which enables the devices of the present invention to be manufactured for disposal after a single use.

It will be apparent from the above, and from the description hereinafter of a preferred embodiment of the present invention, that the device of the present invention embodies additional features not provided by the device disclosed in U.S. Pat. No. 3,398,860 previously discussed. In particular, in addition to providing the feature of a capillary channel of varying length, the device of the present invention enables variation of the cross-sectional size of the capillary channel down to very small sizes and finally to zero. Thus even greater control over the rate of flow of liquids is provided, particularly at extremely low rates, such that flow rates and precision of regulation hitherto not possible, such as rates down to a constant 250 mil per day, may now be achieved. Variation in the cross-sectional size of the capillary channel is provided by the interaction of the area of the external thread on the pin where the ridge of the thread is removed with the area of the internal thread of the body portion where the trough of the thread is filled. Since these areas correspond when the pin is inserted into the body portion to a position where the second end of the external thread of the pin corresponds with the second end of the internal thread of the body portion, no capillary channel at all exists between the facing turns of the threads in these areas. However, when the pin is rotated and hence displaced axially relative to the body portion, the second end of the thread of the pin will no longer correspond with the second end of the thread of the body portion and, in fact, at all times in these areas the amount of which the ridge of the thread of the pin has been removed will exceed the amount by which the trough of the thread of the body portion will be filled and hence a helical capillary channel will be found by these threads. Further axial displacement of the pin will increase the disparity between these amounts and hence increase the cross-sectional area of the helical channel so formed.

Further features of the present invention will be apparent from the following description of one embodiment which is given by way of illustration and not as limiting the invention. Reference is made to the accompanying drawings in which.

Figure 1:
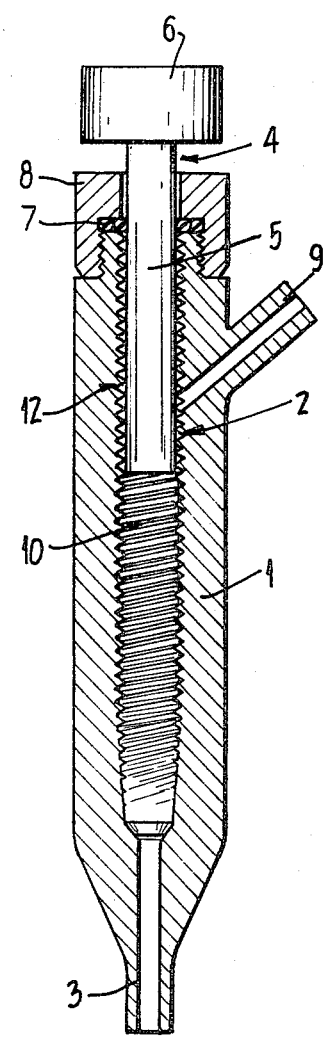
FIG. 1 is an axial section through the embodiment, showing the pin of the device in a first position relative to the body portion.

The embodiment of the invention shown in FIG. 1 comprises a body portion 1 having a bore 2 extending therethrough. At or towards one end, the body portion 1 is provided with a nozzle 3 for connection of the device to a tubular delivery pipe, not shown, which delivers liquid from the device to, for example, an infusion needle. A pin 4 is inserted in the bore 2 of body portion 1 from the end remote from nozzle 3, the pin comprising a shaft 5 which extends into the bore 2 and a cap 6 of larger cross-sectional area than the shaft to assist rotation of the pin. The cap 6 may be graduated or provided with other suitable indicia to provide an indication of the number of rotations or degree of rotation of the pin relative to the body portion 1.

Pin 4 is sealed within the bore 2 by rubber packing rings 7 which are retained in position by a threaded cap portion 8 which is screwed onto the body portion 1 and through which the shaft 5 of pin 4 also extends. Liquid to be regulated is admitted to the bore 2 through an inlet nozzle 9 on the side of body portion 1, and nozzle 9 is adapted for connection to a feed pipe not shown, from a liquid supply. Usually the feed of the liquid is a gravity feed, with a bottle or other container of the liquid being suspended higher than the patient with a feed line down to a device according to this invention and a delivery line from the device down to the patient.

As will be apparent from FIG. 1, bore 2 of body portion 1 is provided with an internal helical thread 12 and details of this thread will be described more fully hereinafter. Shaft 5 of pin 4 is also provided with an external helical thread 10, also to be described in more detail later, which screws into the internal helical thread or bore 2 so that rotation of the pin 4 relative to the body portion 1 results in axial displacement of the pin relative to the body portion. For assembly purposes or for cleaning and sterilizing, the pin 4 may be completely screwed out of the body portion 1, by removal of the cap portion 8 from its screwed engagement with the body portion 1, followed by completely screwing pin 4 out of the bore 2.

Figure 2:
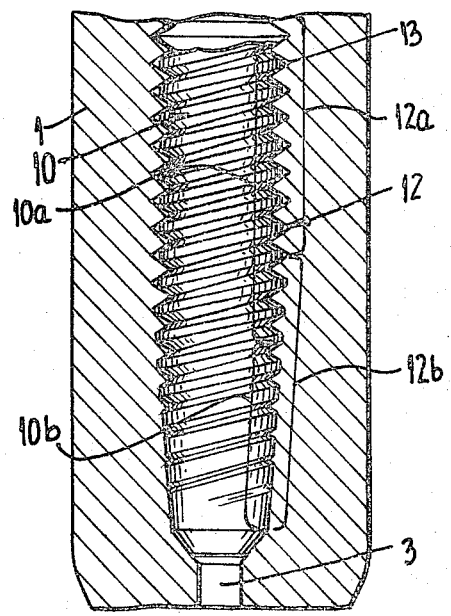
FIG. 2 is a detailed axial section of part of the embodiment, showing the pin of the device in the same position as in FIG. 1.
Figure 3:
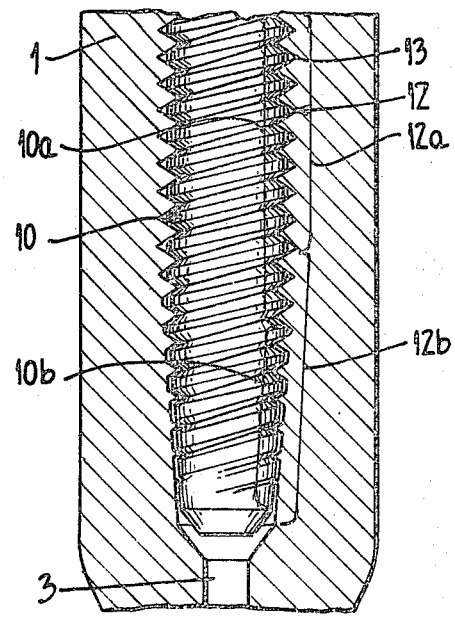
FIG. 3 is a detailed axial section of the same part of the embodiment as shown in FIG. 2, showing the pin of the device axially displaced relative to its position in FIGS. 1 and 2.

FIGS. 2 and 3 show details of threads 10 and 12 in more detail, with FIG. 2 showing the relationship of these threads when pin 4 is completely screwed into body portion 1, and FIG. 3 showing their relationship when the pin is nearly, but not completely, screwed into the body portion.

As will be seen more clearly from these Figures, the internal helical thread 12 of bore 2 consists of a thread part 12a of normal thread and a thread part 12b, towards the end of the thread 12 nearest the nozzle 3, in which the trough of the thread is filled to an increasing extent as the thread extends toward the nozzle 3. The external helical thread 10 on shaft 5 similarly consists of two thread parts, shown as 10a and 10b. Thread part 10a, is, in use, closer to the inlet nozzle 9 than the other thread part and the ridge of the thread in this part is removed so that, in combination with the normal thread of thread part 12a, a helical capillary channel is formed. Thread part 10b is, in use, closer to the nozzle 3 than thread part 10a and the ridge of the thread in this part is removed to an increasing extent as the thread extends towards the nozzle 3. The extent of removal of the ridge of the thread in thread part 10b corresponds with the extent of filling of the troughs in coincident thread in thread part 12b, so that in the position shown in FIG. 2, the helical capillary channel 13 does not continue around the thread parts 10b and 12b to nozzle 3. Thus when the pin 4 is completely screwed into the body portion 1 as shown in FIG. 2, liquid entering the device through inlet nozzle 9 is not provided with a capillary channel through which it can pass to nozzle 3.

However, when pin 4 is unscrewed from its position in FIG. 2 to a position such as that shown in FIG. 3, capillary channel 13 formed between thread parts 10a and 12a is extended through between thread parts 10b and 12b to provide a complete channel for liquid to pass through to nozzle 3. This extension of the capillary channel 13 between thread parts 10b and 12b results from the fact that the extent of removal of the ridge of the thread in thread part 10b is greater than the extent of filling of the trough of that thread in thread part 12b which is co-incident in this position. Thus, it will be apparent that a helical capillary channel of varying crosssectional area can be formed by screwing or unscrewing the pin 4 relative to body portion 1, with a maximum crosssectional area being attained when thread part 10b is positioned so as to be co-incident with thread part 12a.

It will also be apparent that just as the material from which the device is manufactured may be selected to suit its intended purpose, the various dimensions of the components of this device may be selected to provide the desired results. In particular, the diameter pitch and depth of the threads 10 and 12, as well as the degree of, and rate of increase of, the removal of the ridge or filling of the troughs of the various thread parts may be varied as desired without departing from the essential concept of the invention.

Further, although the embodiment shown in the drawings is adapted for manual rotation of the pin 4, in an alternative embodiment this rotation may be performed by a motor or like apparatus which may, in turn, be automatically actuated and controlled by detecting means such as a flow sensor or drop counter.

From the foregoing description it will therefore be appreciated that the present invention provides a most effective and reliable device for the precise and constant regulation of the flow of a liquid. While the present invention has been described with reference to preferred embodiments, it will be generally understood by those skilled in the art that various changes may be made and equivalents may be substituted for elements thereof without departing from the true spirit and scope of the invention.

The claims defining the invention are as follows:

1. A device for regulating the flow of a liquid which comprises a tubular body portion provided with an internal helical thread, said liquid being supplied at or towards one end of said body portion and being withdrawn at or towards the other end of said body portion; and a pin fitting within the tubular body portion and inserted in one end thereof, and being provided with an external helical thread cooperating with the said internal helical thread of the body portion such that rotation of the pin with respect to said body portion causes axial displacement of the pin within the body portion; said external helical thread on said pin having a first and a second end, the ridge of the external helical thread being removed to an increasing extent over at least part of the length thereof from said first to said second end such that said ridge is completely removed at said second end thereof, and said internal helical thread in said body portion having a first and a second end corresponding to said first and second ends of said external helical thread, the trough of the internal helical thread being filled to an increasing extent over at least part of the length thereof from said first to said second end such that said trough is completely filled at said second end thereof, the length of said internal helical thread over which the trough of the thread is filled to an increasing extent corresponding to the said length of said external helical thread over which the ridge of the thread is removed to an increasing extent such that the extent to which the trough of the internal helical thread is filled at any point on the length thereof corresponds with the extent to which the ridge of the external helical thread is removed at a corresponding point on the length thereof.

2. A device as claimed in claim 1, wherein the ridge of the external helical thread is removed to a constant extent over the remainder, if any, of the length thereof from said first to said second end.

3. A device as claimed in claim 1, wherein the rate at which the ridge of the external helical thread is removed to an increasing extent and at which the trough of the internal helical thread is filled to an increasing extent is a linear rate.

4. A device as claimed in claim 1, wherein the pin is provided with a shaft projecting beyond the body portion and sealing means are provided between said shaft and said body portion.

5. A device as claimed in claim 4, wherein said sealing means comprises one or more sealing rings which guide the shaft within the body portion while allowing both rotation and axial displacement of said shaft.

6. A device as claimed in claim 4, wherein a cap is provided on the end of said shaft remote from the external helical thread, said cap being of greater crosssectional area than said shaft.

7. A device as claimed in claim 1, wherein the tubular body portion is provided with an outlet nozzle at one end thereof, said outlet nozzle being coaxial with said body portion, and an inlet nozzle is provided towards the other end of said body portion, said inlet nozzle being positioned in the side of said body portion and communicating with the tubular interior thereof.

8. A device as claimed in claim 7, wherein the internal helical thread extends within the body portion to the end thereof remote from said outlet nozzle.

9. A device as claimed in claim 1, characterized in that said tubular body portion and said pin are made of a plastics material.

* * * * *